United States Patent
Brkic (10) Patent No.: US 7,253,816 B2
(45) Date of Patent: Aug. 7, 2007

(54) COMPUTER GRAPHICS ACCELERATION METHOD AND APPARATUS FOR EVALUATING WHETHER POINTS ARE INSIDE A TRIANGLE

(75) Inventor: Toni Brkic, Malmö (SE)

(73) Assignee: STMicroelectronics Limited, Bristol (GB)

( * ) Notice: Subject to any disclaimer, the term of this patent is extended or adjusted under 35 U.S.C. 154(b) by 433 days.

(21) Appl. No.: 10/384,183

(22) Filed: Mar. 7, 2003

(65) Prior Publication Data

US 2004/0021675 A1 Feb. 5, 2004

(30) Foreign Application Priority Data

Mar. 11, 2002 (EP) .................................. 02251703

(51) Int. Cl.
*G06T 11/20* (2006.01)
(52) U.S. Cl. ..................................................... 345/441
(58) Field of Classification Search ................ 345/443, 345/441
See application file for complete search history.

(56) References Cited

U.S. PATENT DOCUMENTS 5,862,252 A * 1/1999 Yamamoto et al. .......... 382/154
5,982,384 A 11/1999 Prouty et al. ................ 345/441
6,433,790 B1 * 8/2002 Taylor et al. ................ 345/611

FOREIGN PATENT DOCUMENTS

WO  WO 02/077919  * 11/2000

OTHER PUBLICATIONS

"Point nad Triangle", http://web.archive.org/web/20020124122021/http://mcraefamily.com/MathHelp/GeometryPointAndTriangle2.htm.*
"Ask Dr. Math", http://mathforum.org/library/drmath/view/55063.html.*
"A Parallel Algorithm for Polygon Rasterization", Juan Pineda, Computer Graphics, vol. 22, No. 4, Aug. 1988, pp. 17-20.*
De Miras, et al., "Inclusion Test for Curved-Edge Polygons", *Computers and Graphics*, Pergamon Press Ltd, Oxford, Great Britain, vol. 21, No. 6, pp. 815-824, Nov. 12, 1997; XP004106911.
Paul S. Heckbert (Ed.), "Graphics Gems IV", *Academic Press*, sections Simplex Volumes and Subvolumes, pp. 154-156, San Diego, London and San Francisco, 1994; XP002207538.
European Search Report, 02251703.1, dated Jul. 25, 2002.

* cited by examiner

*Primary Examiner*—Ryan Yang
(74) *Attorney, Agent, or Firm*—Jenkens & Gilchrist, PC (57) ABSTRACT

A computer graphics accelerator apparatus and method determines whether a pixel at predetermined pixel co-ordinates in an area being rasterized is within a triangle defining a sub-area of the area. The coordinate system in relation to which the triangle is defined is translated such that the pixel co-ordinates are disposed at the origin of the coordinate system. Determinants of matrices based on at least two of the coordinate values of at least two of the vertices are calculated and their signs compared. Based on this comparison a determination as to pixel location with respect to the triangle may be made.

28 Claims, 6 Drawing Sheets

COMPUTER GRAPHICS ACCELERATION METHOD AND APPARATUS FOR EVALUATING WHETHER POINTS ARE INSIDE A TRIANGLE

CROSS-REFERENCE

This application claims priority from European Patent Application No. 02251703.1, filed Mar. 11, 2002, the disclosure of which is hereby incorporated by reference.

BACKGROUND OF THE INVENTION

1. Technical Field of the Invention

The present invention relates to methods and hardware in the field of graphics processing, and, in particular, to the rasterizing of triangles.

2. Description of Related Art

In graphics accelerator chips used in, for example, personal computers (PCs), it is desirable to reduce as far as possible the number of pixels for which textures are retrieved from texture memory. One way this can be reduced is to include a step during rasterization of individual pixels within a predetermined area, representing a screen or the forming a sub-part of a screen, to ascertain whether each pixel being scanned is within a triangle being rasterized. Only those pixels that are within a triangle being rasterized have texture and color mapping performed on them, thereby reducing the load on the texture memory bandwidth.

While this is a desirable procedure in principle, checking whether a given pixel is within a triangle is not a trivial matter, and the resultant calculations can drastically increase the load on the graphics chip central processing unit (CPU). This is exacerbated by the fact that all triangles in a given area need to be tested.

There is accordingly a need for a method and apparatus that ascertains, with reduced processor load, whether a pixel is within a triangle defined in relation to an area.

SUMMARY OF THE INVENTION

In one embodiment, the present invention provides a method for determining whether a pixel at predetermined pixel co-ordinates in an area being rasterized is within a triangle defining a sub-area of the area. The triangle is defined by first, second and third coordinate pairs representing the triangle's vertices. The method includes the steps of:
  (a) translating a coordinate system in relation to which the triangle is defined, such that the pixel coordinates are disposed at the origin of the coordinate system;
  (b) calculating determinants of matrices defined by the coordinate values of at least two of the vertices;
  (c) determining the signs of the determinants; and
  (d) determining whether the pixel is within the triangle on the basis of the signs determined in step (c).

Preferably, step (b) further includes the step of calculating first, second and third determinants of respective first, second and third matrices defined by first, second and third respective paired combinations of the first, second and third coordinate pairs, and step (d) further includes the step of determining that the pixel is within the triangle if the signs of all determinants are the same.

In another embodiment, the method further includes the step, prior to performing step (b), of testing signs of the coordinate values of the vertices such that:
  in the event each of, the vertices is in a different quadrant, the matrices for which determinants are calculated are based on coordinates of a selected two of the vertices, the selected two vertices being in adjacent quadrants; or
  in the event two of the vertices are in a quadrant and the other vertex is in a diagonally opposite quadrant, the matrices for which determinants are calculated are based on coordinates of the two vertices in the same quadrant; and
  step (d) includes the step of determining that the pixel is within the triangle if the signs of the two determinants calculated are different from each other.

Preferably, the method further includes the step, performed prior to step (b), of testing signs of at least some of the coordinate values, such that, if all the triangle's vertices are in adjacent quadrants, the pixel is determined to be outside the triangle. In this case, the determinants are only calculated in step (b) in the event that the pixel is not determined to be outside the triangle as a result of testing the signs of the coordinate values.

In yet another embodiment, the present invention provides a method of displaying a triangle on a computer display screen, the method including the steps of:
  for each pixel:
    (i) determining whether a pixel at predetermined pixel coordinates in an area being rasterized is within a triangle defining a sub-area of the area; and
  for each pixel in the sub-area:
    (ii) determining the color of the pixel;
    (iii) writing the color of the pixel to a framebuffer; and
    (iv) outputting the contents of the framebuffer to the computer display screen.

In still another embodiment, computer graphics accelerator hardware determines whether a pixel at predetermined pixel coordinates in an area being rasterized is within a triangle defining a sub-area of the area. The triangle is defined by first, second and third coordinate pairs representing the triangle's vertices. The accelerator hardware is configured to:
  (a) translate the system in relation to which the triangle is defined, such that the pixel coordinates are disposed at the origin of the system;
  (b) calculate determinants of matrices defined by the coordinate values of at least two of the vertices;
  (c) determine the signs of the determinants; and
  (d) determine whether the pixel is within the triangle on the basis of the signs determined in operation (c).

Preferably, calculating the determinants includes calculating first, second and third determinants of respective first, second and third matrices defined by first second and third respective paired combinations of the first, second and third coordinate pairs. The hardware is configured to determine that the pixel is within the triangle if the signs of all determinants are the same.

Preferably, the computer graphics accelerator hardware is configured to test signs of the coordinate values of the vertices prior to calculating the determinants, such that:
  in the event each of the vertices is in a different quadrant, the matrices for which determinants are calculated are based on coordinates of a selected two of the vertices, the selected two vertices being in adjacent quadrants; or
  in the event two of the vertices are in a quadrant and the other vertex is in a diagonally opposite quadrant, the matrices for which determinants are calculated are based on coordinates of the two vertices in the same quadrant; and
  wherein the pixel is determined to be within the triangle if the signs of the two determinants calculated are different from each other.

Preferably, the computer graphics accelerator hardware is configured to test signs of. at least some of the coordinate values prior to calculating the determinants, such that, if all the triangle's vertices are in adjacent quadrants, the pixel is determined to be outside the triangle. In this case, the determinants are only calculated in operation (b) in the event that the pixel is not determined to be outside the triangle as a result of testing the signs of the coordinate values.

In yet another embodiment, the present invention provides computer graphics accelerator hardware for displaying a triangle on a computer display screen, the hardware being configured to:

for each pixel:
  (i) determine whether a pixel at predetermined pixel coordinates in an area being rasterized is within a triangle defining a sub-area of the area; and for each pixel in the sub-area;
  (ii) determine the color of the pixel;
  (iii) write the color of the pixel to a framebuffer; and
  (iv) output the contents of the framebuffer to the computer display screen.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

Figure 8:
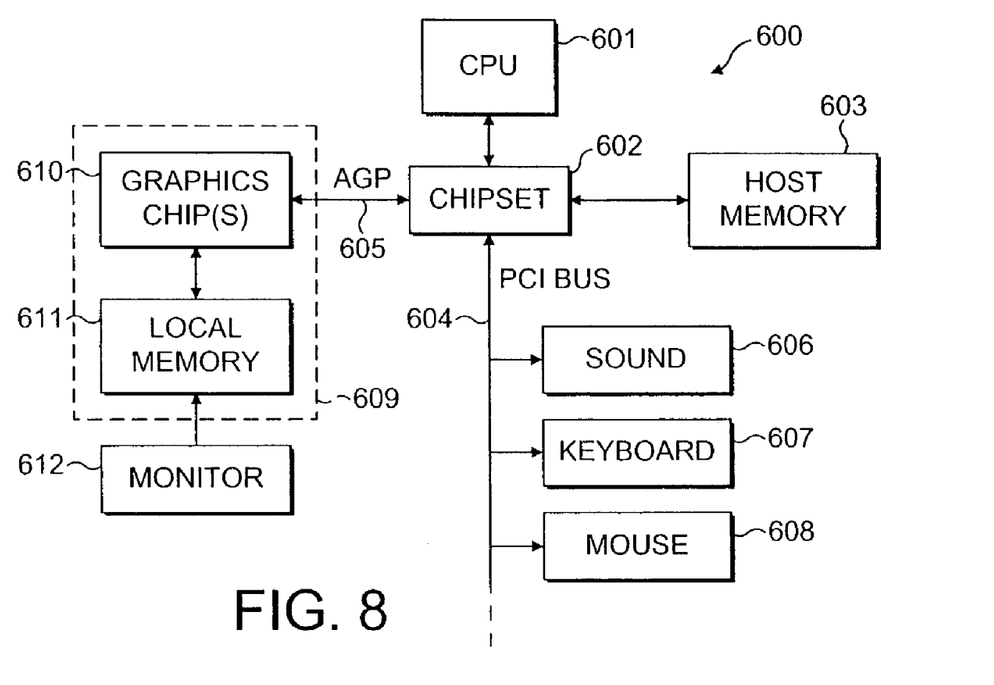
FIG. 8 is a personal computer system incorporating graphics accelerator hardware, in accordance with the invention.

Referring to the drawings, and FIG. 8 in particular, the preferred embodiment is implemented in a graphics accelerator chip 610, which is mounted on a graphics card 609 installed in an IBM-compatible personal computer (PC) 600 running, for example, Microsoft Corporation's Windows operating system and other software. The PC has a processor 601, PCI bus 604, AGP connection 605, host memory 603, a display monitor 612, and other ancillaries such as one or more hard-disk drives, a mouse 608, a keyboard 607, a sound card 606 and so on. The PCI bus 604 and AGP connection 605 communicate with the processor 601 via a chipset 602. PC architecture is relatively well understood by those skilled in the relevant art, and so will not be described in further detail within this specification. It will also be appreciated that the invention can be applied to many other types of computers with suitable modification, and that the graphics chip can alternatively be mounted directly to, for example, a motherboard or be implemented in any other way. The method of the invention can also be implemented in software and can therefore be practiced via a general purpose processor, such as processor 601 for example.

The invention has primarily been developed for use in graphics acceleration chips for use in video accelerator cards for PCs, and will be described hereinafter with reference to this application. However, it will be appreciated that the invention is not limited to use in this field.

The rasterization process is well known to those in the art, and involves the conversion of a mathematical description of a triangle in three-dimensional space into a two dimensional array of pixels for display on, for example, the computer monitor 612. In the present case, rasterization includes ascertaining whether each pixel that is being rasterized is disposed within the triangle. Only pixels that are found to be within the triangle will have textures retrieved from texture memory on the graphics card. This would involve determining a color of the pixel within the triangle. This color is written to a framebuffer. Then, the contents of the framebuffer are output to the computer display screen.

Figure 1:
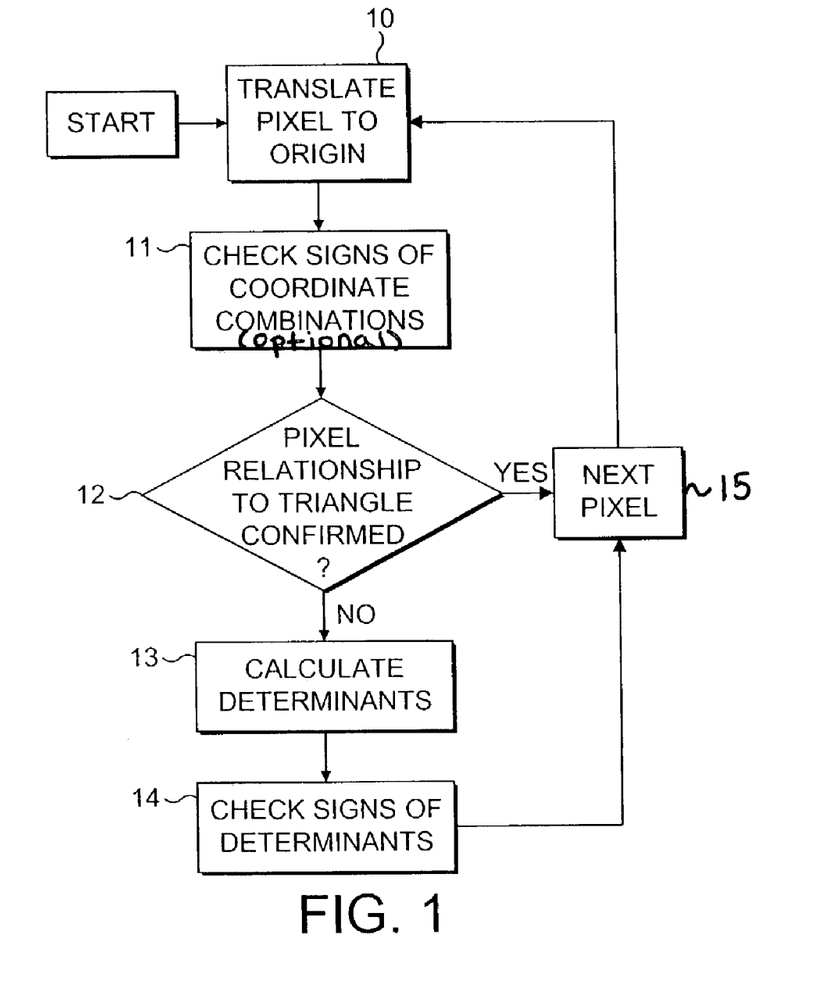
FIG. 1 is a flowchart showing a method for rasterization of a pixel in accordance with the invention.
Figure 2:
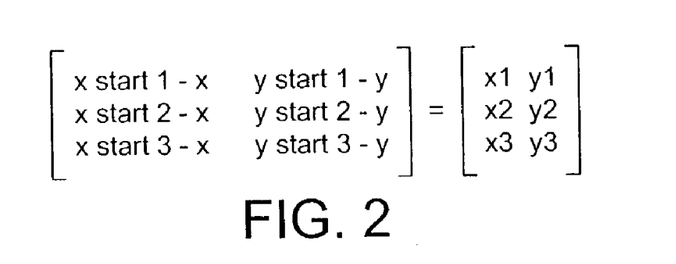
FIG. 2 shows a matrix operation for translating a pixel being rasterized to the origin of the coordinate system being considered, in accordance with a first step of the invention.

Referring to FIGS. 1 and 2, the steps involved in implementing the preferred embodiments include the following steps for each pixel as it is considered.

First, the pixel being considered is translated (step 10, FIG. 1) such that it is disposed at the origin (0,0) of the coordinate system in use. The matrix operation for achieving this translation is shown in FIG. 2. The output matrix includes three coordinate pairs (x1, y1), (x2,y2) and (x3,y3), representing the respective translated vertices of the triangle being considered.

Once this translation has been made, it is necessary to ascertain whether the pixel being considered is within the triangle. A number of potential scenarios are illustrated in FIGS. 3a to 3f.

An optional step at this stage is to check the signs (step 11) of respective combinations of x and y coordinates of the triangles vertices. For example, in the case shown in FIG. 3a, all three vertices are in the first quadrant of the plane. This means that the x values of all the triangle vertices' have the same (in this case positive) sign and all the y values also have the same (in this case positive) sign as well. It will be appreciated that where all the x values have a common sign and all the y values have a common sign, the origin, and therefore the pixel being considered, must be outside the triangle.

Figure 3A:
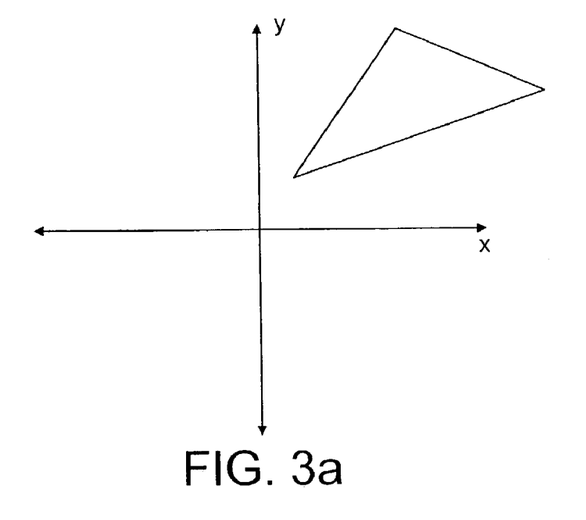
FIGS. 3a to 3f show respective potential triangle scenarios.
Figure 3B:
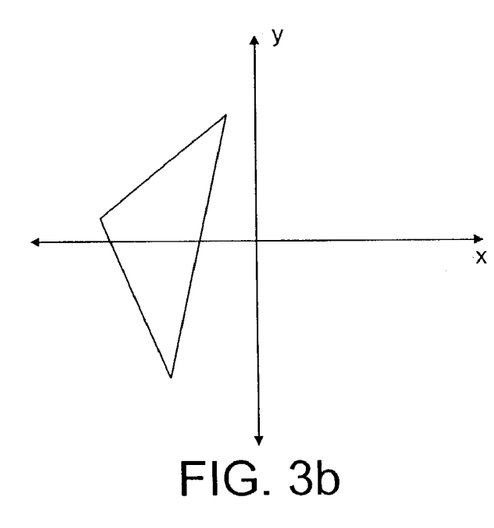
Figure 3C:
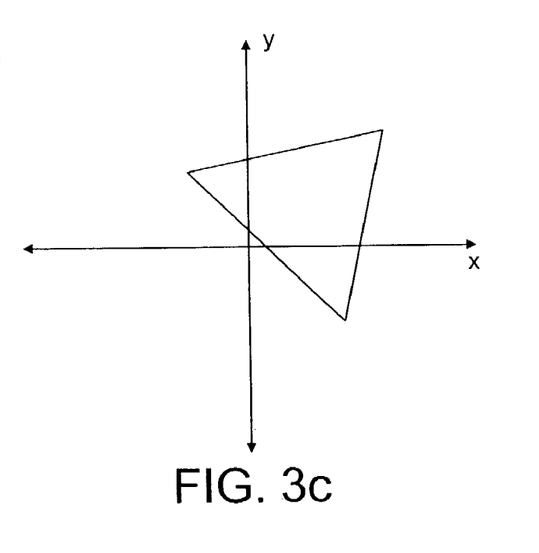
Figure 3D:
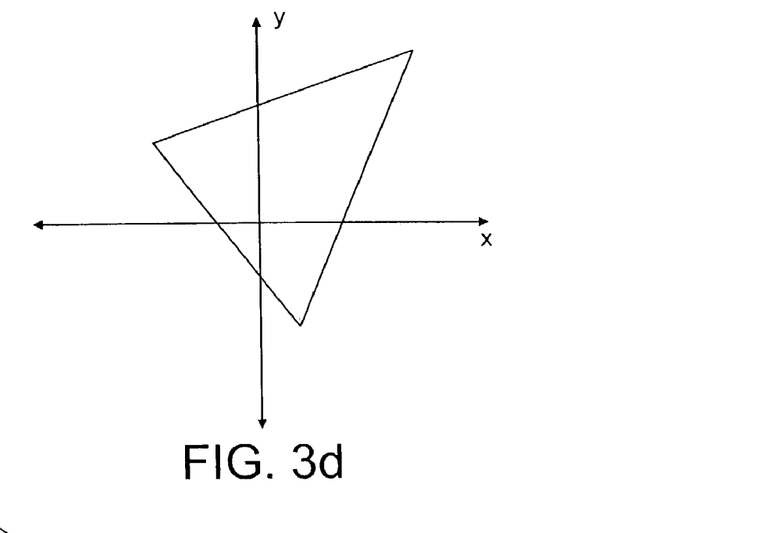

More generally, even if only the x values or the y values have a common sign, this will still imply the case exemplified in FIG. 3b, where all of the vertices are on the same side of the (in this case) y axis. Accordingly, a simple set of sign comparisons between the x values and/or the y values of the vertices can be performed as an optional initial step to avoid performing the rest of the steps to be described.

An assessment (step 12) is made and if all the vertices are on one side or the other of either the x or y axis, then the pixel is noted as being outside the triangle and the method moves on (step 15) to consider the next pixel.

If the vertices are not all on one side of the x or y axis, then it is not clear whether the pixel is inside or outside the triangle. For example, in FIG. 3c the origin (that is, the pixel being considered) is outside the triangle, while in FIG. 3d the vertices are in the same quadrant and the origin is inside the triangle.

Figure 3E:
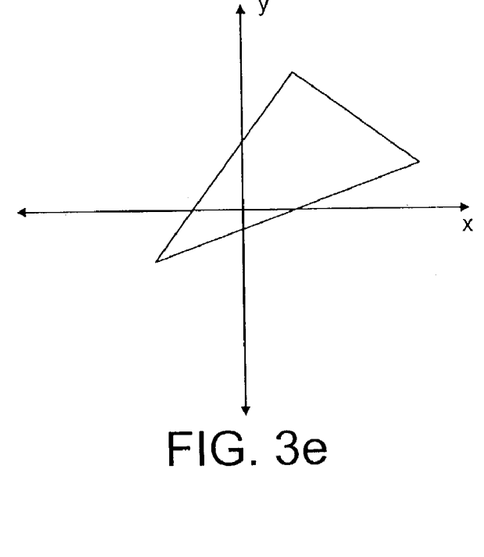
Figure 3F:
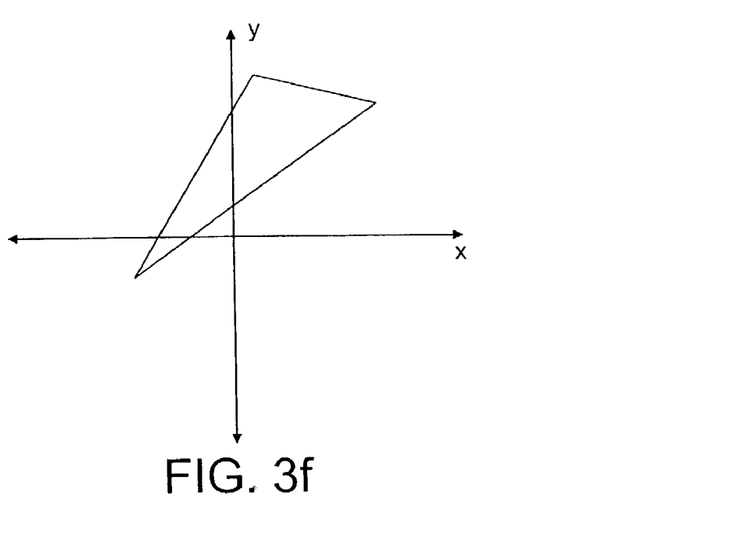

The other cases to be considered are shown in FIGS. 3e and 3f, in which one vertex is in one quadrant and the other two are in the diagonally opposite quadrant. Again, FIGS. 3e and 3f show that this condition can result in the origin being inside or outside the triangle.

To distinguish between the cases shown in FIGS. 3c to 3f, the next step is to take the determinants (step 13) of respective matrices, each of the matrices being formed from a pair of vertex coordinates. For example, the matrix for vertices 1 and 2 are:

$$\begin{bmatrix} x1 & y1 \\ x2 & y2 \end{bmatrix}$$

Matrices are also formed for vertices 2 and 3, and vertices 3 and 1. Consistency of order is important to ensure that the following determination is correct.

The determinants of the respective matrices are calculated (step 13). It will be appreciated that each determinant represents twice the area of the triangle defined by the two vertices of the corresponding matrix and the origin.

Figure 4:
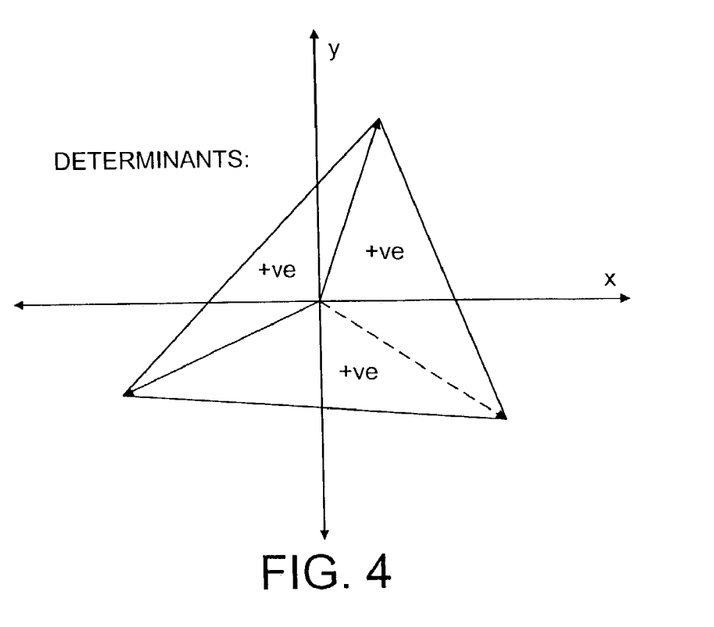
FIGS. 4 and 5 show potential scenarios for calculating determinants, in accordance with the invention.
Figure 5:
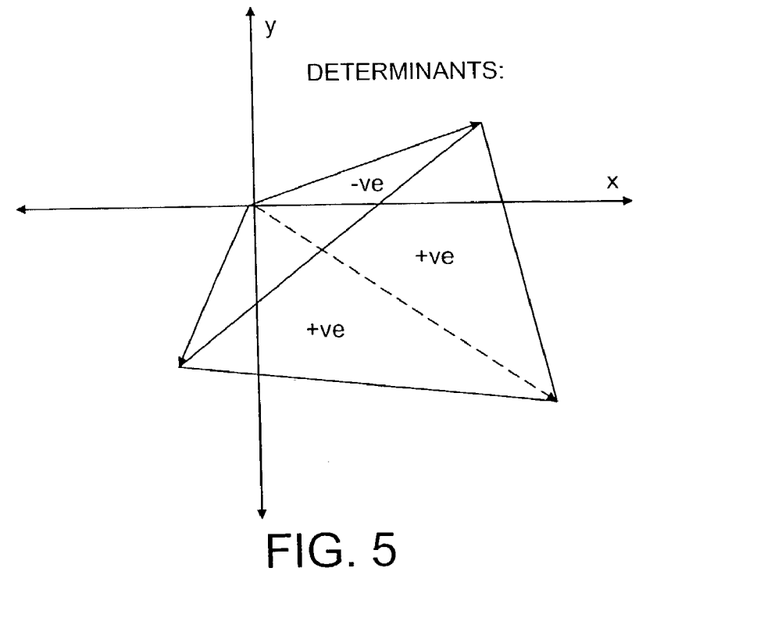

The next step is to check (step 14) the sign of the determinants. As shown in FIG. 4, if the origin is within the triangle, then each of the determinants represents a positive (in this case) area. However, as shown in FIG. 5, if the sign of one of the determinants differs from the signs of the other two determinants, then the value represented by the differently signed determinant implies that the origin is outside the triangle.

It will be appreciated that if the order in which the vertices are placed into the matrices is reversed (that is, the matrices are based on vertex pairs 2 and 1, 3 and 2, and 1 and 3), then all of the determinants will be negative in the event the origin is inside the triangle. The test is whether the signs of the three determinants are the same, not what their values are.

Another embodiment in accordance with the present invention will now be described, with specific reference to FIGS. 1, 6 and 7. Step 10 of FIG. 1 is the same as in the previously described embodiment, and step 11 still involves ascertaining whether all vertices are on one side of the x or y axes. However, in this case step 11 further involves checking the signs of various vertices to ascertain which of the two possible remaining scenarios are the case for the triangle in question. The first scenario is where each of the vertices is in a quadrant on its own (FIG. 6) and the second is where two vertices are in one quadrant and the other is in the diagonally opposite quadrant (FIG. 7).

Figure 6:
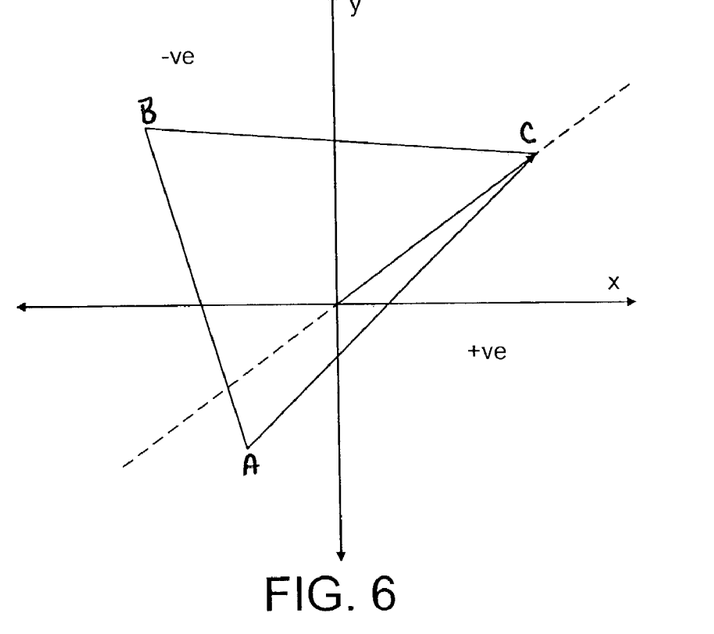
FIGS. 6 and 7 show alternative potential scenarios for calculating determinants, in accordance with the invention.
Figure 7:
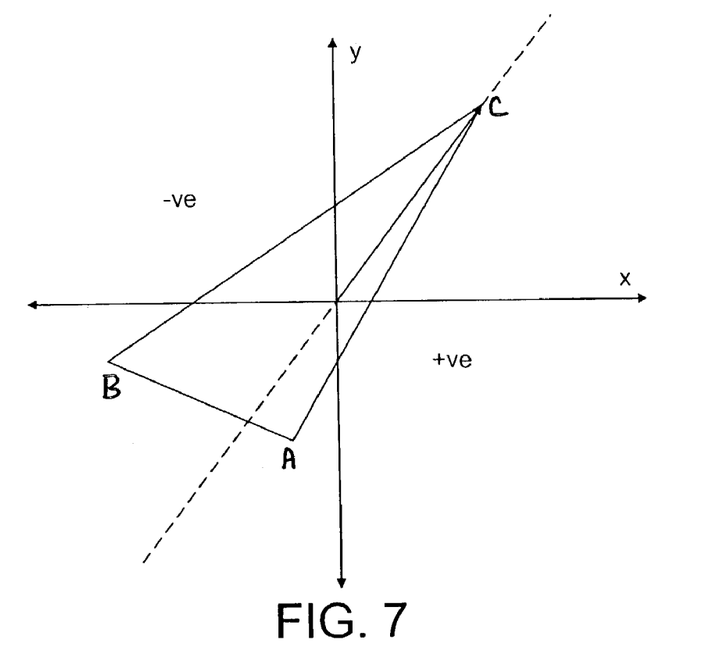

Dealing with the case of FIG. 6, step 13 involves selecting two of the vertices. The selected vertices must be those in diagonally opposite quadrants, which can be determined by checking signs of coordinate values. This can, for example, be done based on the previous step where initial tests to see whether all vertices were on one side of the x or y axes. In the case of FIG. 6, the vertices that satisfy these conditions are vertices A and C.

Once the two vertices are chosen, determinants of matrices defined by the coordinates of the vertices are calculated. In the example of FIG. 6, these matrices are:

$$\begin{bmatrix} xB & yB \\ xA & yA \end{bmatrix} \text{ and } \begin{bmatrix} xB & yB \\ xC & xC \end{bmatrix}$$

By contrast, in the case shown in FIG. 7, the matrices for which determinants are to be calculated are based on the two vertices in the same quadrant. The vertices that satisfy this condition are vertices A and B. This gives matrices with the same reference numerals as those described in relation to the FIG. 6 case.

In the cases shown in FIGS. 6 and 7, once the determinants are calculated (step 13), their signs are compared (step 14) to see whether the point is inside or outside the triangle. In contrast to the earlier embodiment, if the signs of the two determinants are different from each other, then the pixel is inside the triangle. Obviously, if the signs are the same then the pixel is outside the triangle. As for the previous embodiment, the process is then repeated for the other pixels to be tested (step 15).

In terms of the advantages achieved, without the translation step, the method can be expressed in the following mathematical steps:

Determinant calculation:

(yp−y1)*(xp−x1)−(xp−x1)*(y2−y1)

(yp−y3)*(xp−x3)−(xp−x3)*(y1−y3)

(yp−y2)*(xp−x2)−(xp−x2)*(y3−y2)

This requires six multiplication operations and fifteen subtraction operations. However, adding the translation step gives the following:

Translation:

(x1−xp, y1−yp)=(x1p, y1p)

(x2−xp, y2−yp)=(x2p, y2p)

(x3−xp, y3−yp)=(x3p, yap)

Determinant calculation x1p*y2p−y1p*x2p x2p*y3p−y2p*x3p x3p*y1p−y3p*x1p

This still requires six multiplication operations. However, only nine subtraction operations are required, notwithstanding the addition of the translation step compared to the previous example.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for displaying a pixel, comprising:
   determining whether a pixel at predetermined pixel co-ordinates in an area being rasterized is within a triangle defined by first, second and third coordinate values representing the triangle's vertices, wherein determining comprises the steps of:
   translating a coordinate system in relation to which the triangle is defined, such that the pixel co-ordinates are disposed at an origin of the coordinate system;
   calculating determinants of matrices defined by the coordinate values of at least two of the vertices;
   identifying the signs of the determinants; and
   identifying that the pixel is within the triangle on the basis of the signs of the determinants;
   displaying the pixel if the pixel is within the triangle; and
   repeating the step of determining for each one of a plurality of pixels in the area being rasterized.

2. The method according to claim 1, wherein the step of calculating includes the step of calculating first, second and third determinants of respective first, second and third matrices defined by first, second and third respective paired combinations of the first, second and third coordinate values, and the step of determining includes the step of determining that the pixel is within the triangle if all the signs of the determinants are the same as each other.

3. The method according to claim 1, further including the step, prior to the step of calculating, of testing signs of the coordinate values of the vertices such that, in the event each of the vertices is in a different quadrant of the coordinate system, the matrices for which determinants are calculated are based on coordinates of a selected two of the vertices, the selected two vertices being in diagonally opposite quadrants;

wherein the step of determining includes the step of determining that the pixel is within the triangle if the signs of the two determinants calculated are different from each other.

4. The method according to claim 1, further including the step, prior to the step of calculating, of testing signs of the coordinate values of the vertices, such that, in the event two of the vertices are in a quadrant of the coordinate system and the other vertex is in a diagonally opposite quadrant, the matrices for which determinants are calculated are based on coordinates of the two vertices in the same quadrant;

wherein the step of determining includes the step of determining that the pixel is within the triangle if the signs of the two determinants calculated are different from each other.

5. The method according to claim 1, further including the step, performed prior to the step of calculating, of testing signs of the coordinate values, such that, if all the triangle's vertices are in adjacent quadrants, the pixel is determined to be outside the triangle, and further including the step of moving on to a next pixel if the step of testing is satisfied.

6. A method for generating an output, comprising:
determining whether a pixel at predetermined pixel co-ordinates in an area being rasterized is within a triangle defined by first, second and third coordinate values representing the triangle's vertices, wherein determining comprises the steps of:
translating a coordinate system in relation to which the triangle is defined, such that the pixel co-ordinates are disposed at an origin of the coordinate system;
calculating determinants of matrices defined by the coordinate values of at least two of the vertices;
identifying the signs of the determinants; and
identifying that the pixel is within the triangle on the basis of the signs of the determinants;
determining the color of the pixel if the pixel is within the triangle;
writing the color of the pixel to a framebuffer; and
displaying an output of the contents of the framebuffer to the computer display screen; and
repeating the step of determining for each one of a plurality of pixels in the area being rasterized.

7. Computer graphics accelerator hardware comprising:
a texture memory containing texture data; and
a graphics accelerator chip configured to:
determine whether a pixel at predetermined pixel co-ordinates in an area being rasterized is within a triangle defined by first, second, and third coordinate values representing the triangle's vertices, wherein the determination comprises:

translate a coordinate system in relation to which the triangle is defined, such that the pixel co-ordinates are disposed at the origin of the coordinate system;
calculate determinants of matrices defined by the coordinate values of at least two of the vertices;
identify the signs of the determinants; and
identify that the pixel is within the triangle on the basis of the identified signs of the determinants; and
repeat the operation to determine for each one of a plurality of pixels in the area being rasterized;
wherein the graphics accelerator chip retrieves texture data from the texture memory for each pixel determined to be within the triangle.

8. The computer graphics accelerator hardware according to claim 7, wherein the operation to calculate the determinants includes an operation to calculate first, second and third determinants of respective first, second and third matrices defined by first, second and third respective paired combinations of the first, second and third coordinate values, the hardware being configured to determine that the pixel is within the triangle if all the signs of the determinants are the same as each other.

9. The computer graphics accelerator hardware according to claim 7, wherein the determination further comprises: test signs of the coordinate values of the vertices prior to the operation to calculate the determinants, such that, in the event each of the vertices is in a different quadrant of the coordinate system, the matrices for which determinants are calculated are based on coordinates of a selected two of the vertices, the selected two vertices being in diagonally opposite quadrants;

wherein the pixel is determined to be within the triangle if the signs of the two determinants calculated are different from each other.

10. The computer graphics accelerator hardware according to claim 7, wherein the determination further comprises: test signs of the coordinate values of the vertices prior to the operation to calculate the determinants, such that, in the event two of the vertices are in a quadrant of the coordinate system and the other vertex is in a diagonally opposite quadrant, the matrices for which determinants are calculated are based on coordinates of the two vertices in the same quadrant;

wherein the pixel is determined to be within the triangle if the signs of the two determinants calculated are different from each other.

11. The computer graphics accelerator hardware according to claim 7, wherein the determination further comprises: test signs of the coordinate values prior to calculating the determinants, such that, if all the triangle's vertices are in adjacent quadrants of the coordinate system, the pixel is determined to be outside the triangle, and the hardware further operating to move on to a next pixel if the test is not satisfied.

12. The computer graphics accelerator hardware according to claim 7 wherein the processor is further configured, for each pixel determined to be within the triangle, to:
determine the color of the pixel;
write the color of the pixel to a framebuffer; and
output the contents of the framebuffer to the computer display screen.

13. A method for displaying a pixel, comprising:
determining whether a pixel at a predetermined pixel coordinate in an area being rasterized is within a triangle defined by a first, second and third coordinate values representing the vertices of the triangle, wherein determining comprises the steps of:
translating a coordinate system in relation to which the triangle is defined, such that the predetermined pixel coordinate is disposed at the origin of the coordinate system;
calculating the determinants of three matrices defined by the coordinate values of the three vertices of the triangle;
determining the signs of the determinants; and
verifying that the pixel is within the triangle if the signs of the determinants are the same;
displaying the pixel if the pixel is within the triangle; and
repeating the step of determining for each one of a plurality of pixels in the area being rasterized.

14. The method according to claim 13, further comprising, prior to the step of calculating the determinants, a step of testing the signs the coordinate values of the vertices of the triangle, such that if two of the vertices are in the same quadrant and one vertex is in an adjacent quadrant, the pixel is determined to be outside the triangle;
wherein the subsequent step of calculating the determinants is not performed.

15. A method for determining whether a pixel at a predetermined pixel coordinate in an area is within a triangle, the triangle being defined by a first, second and third coordinate values representing the vertices of the triangle, comprising the steps of:
translating a coordinate system in relation to which the triangle is defined, such that the predetermined pixel coordinate is disposed at the origin of the coordinate system;
calculating the determinants of matrices defined by the coordinate values of at least two of the vertices of the triangle, wherein if each vertex is in a different quadrant of the coordinate system, the matrices for which the determinants are calculated are based on a selected two vertices in diagonally opposite quadrants; and
displaying the pixel if the signs of the determinants are different.

16. A method for determining whether a pixel at a predetermined pixel coordinate in an area is within a triangle, the triangle being defined by a first, second and third coordinate values representing the vertices of the triangle, comprising the steps of:
translating a coordinate system in relation to which the triangle is defined, such that the predetermined pixel coordinate is disposed at the origin of the coordinate system;
calculating the determinants of matrices defined by the coordinate values of at least two of the vertices of the triangle, wherein if two vertices are in the same quadrant of the coordinate system, and the other vertex is in a diagonally opposite quadrant, the matrices for which the determinants are calculated are based on a selected two vertices in the same quadrant; and
displaying the pixel if the signs of the determinants are different.

17. A computer-based machine, comprising:
means for determining whether a pixel having an input pixel coordinate in an area being rasterized is within a triangle defined by an input matrix comprising a coordinate value for each vertex of the triangle, said means for determining comprising:
translation means operable on the input matrix and the input pixel coordinate for translating the coordinate values comprising the input matrix to a coordinate system having the input pixel coordinate at the origin and outputting a translated matrix; and
determination means operable on the translated matrix for determining whether an area bounded by the triangle defined by the translated matrix includes the origin of the coordinate system, thus placing the pixel within the triangle;
means for sending a display signal to a monitor; and
wherein said means for determining repeats its operation with respect to each pixel in the area being rasterized.

18. The machine according to claim 17, wherein the determination means operates to:
calculate the determinants of three matrices based on the coordinate values of the three vertices comprising the translated matrix;
compare the signs of the determinants; and
identify that the translated matrix includes the origin of the coordinate system if the determinants have the same sign.

19. The machine according to claim 18, wherein the three matrices comprise a first, second, and third paired combination of the three coordinate values of the vertices comprising the translated matrix.

20. The machine according to claim 17, wherein the determination means operates to:
determine the quadrant location in the coordinate system of the vertices of the triangle based on the coordinate values of the translated matrix, such that if all the vertices are in one quadrant or two adjacent quadrants, the translated matrix does not comprise the origin of the coordinate system, and thus the pixel is located outside the triangle; and
advance to consider a next pixel if the pixel is located outside the triangle.

21. A computer-based machine for determining whether a pixel having an input pixel coordinate in an area being rasterized is within a triangle defined by an input matrix comprising a coordinate value for each vertex of the triangle, comprising:
translation means operable on the input matrix and the input pixel coordinate for translating the coordinate values comprising the input matrix to a coordinate system having the input pixel coordinate at the origin and outputting a translated matrix; and
determination means operable on the translated matrix for determining whether an area bounded by the triangle defined by the translated matrix includes the origin of the coordinate system, thus placing the pixel within the triangle, wherein the determination means operates to:
determine the quadrant location in the coordinate system of the vertices of the triangle;
calculate the determinants of matrices based on the coordinate values of two of the vertices of the triangle in diagonally opposite quadrants if each vertex is in a different quadrant of the coordinate system;
means for sending a display signal to a monitor; and
identify that the pixel is within the triangle if the signs of the determinants are different.

22. A computer-based machine for determining whether a pixel having an input pixel coordinate in an area being rasterized is within a triangle defined by an input matrix comprising a coordinate value for each vertex of the triangle, comprising:
translation means operable on the input matrix and the input pixel coordinate for translating the coordinate values comprising the input matrix to a coordinate system having the input pixel coordinate at the origin and outputting a translated matrix; and determination means operable on the translated matrix for determining whether an area bounded by the triangle defined by the translated matrix includes the origin of the coordinate system, thus placing the pixel within the triangle, wherein the determination means operates to:

determine the quadrant location in the coordinate system of the vertices of the triangle;

calculate the determinants of matrices based on the coordinate values of two of the vertices of the triangle in the same quadrant if the other vertex is in a diagonally opposite quadrant;

means for sending a display signal to a monitor; and identify that the pixel is within the triangle if the signs of the determinants are different.

23. A method for displaying a pixel, comprising the steps of:

determining whether a pixel having an input pixel coordinate in an area being rasterized is within a triangle defined by an input matrix comprising a coordinate value for each vertex of the triangle, the step of determining comprising the steps of:

translating the coordinate values comprising the input matrix to a coordinate system having the input pixel coordinate at the origin and outputting a translated matrix; and identifying whether an area bounded by the triangle defined by the translated matrix includes the origin of the coordinate system, thus placing the pixel within the triangle;

displaying the pixel if the pixel is within the triangle; and repeating the step of determining for each one of a plurality of pixels in the area being rasterized.

24. The method according to claim 23, wherein the step of identifying whether an area bounded by the triangle defined by the translated matrix includes the origin of the coordinate system comprises the steps of:

calculating the determinants of three matrices defined by the coordinate values of three vertices comprising the translated matrix;

comparing the signs of the determinants;

identifying that the translated matrix includes the origin of the coordinate system if the determinants have the same sign.

25. The method according to claim 24, wherein the step of calculating the determinants of three matrices comprises the step of calculating the determinants of a first, second, and third paired combination of the coordinate values of the three vertices comprising the translated matrix.

26. The method according to claim 24, further comprising, prior to the step of calculating the determinants of three matrices, the steps of:

determining the quadrant location in the coordinate system of the vertices of the triangle based on the coordinate values of the translated matrix, such that if all the vertices are in one quadrant or two adjacent quadrants, the translated matrix does not comprise the origin of the coordinate system, and thus the pixel is located outside the triangle; and advancing to consider a next pixel if the pixel is located outside the triangle.

27. The method according to claim 24, further comprising, prior to the step of calculating the determinants, the steps of:

determining the quadrant location in the coordinate system of the vertices of the triangle;

calculating the determinants of matrices based on the coordinate values of two of the vertices of the triangle in diagonally opposite quadrants if each vertex is in a different quadrant of the coordinate system;

identifying that the pixel is within the triangle if the signs of the determinants are different; and advancing to consider a next pixel if the pixel is located outside the triangle.

28. The method according to claim 24, further comprising, prior to the step of calculating the determinants, the steps of:

determining the quadrant location in the coordinate system of the vertices of the triangle;

calculating the determinants of matrices based on the coordinate values of two of the vertices of the triangle in the same quadrant if the other vertex is in a diagonally opposite quadrant;

identifying that the pixel is within the triangle if the signs of the determinants are different; and advancing to consider a next pixel if the pixel is located outside the triangle.

* * * * *